(12) United States Patent
Yabe et al.

(10) Patent No.: US 6,383,654 B1
(45) Date of Patent: *May 7, 2002

(54) MOLDED ARTICLE AND PROCESS FOR PRODUCING SAME

(75) Inventors: Toru Yabe; Makoto Nagata, both of Ichihara (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,058

(22) Filed: Aug. 19, 1999

(30) Foreign Application Priority Data

Aug. 21, 1998 (JP) .......................................... 10-235714

(51) Int. Cl.[7] .............................................. B32B 27/32
(52) U.S. Cl. ....................... 428/515; 264/255; 264/275; 264/279; 428/516; 428/523
(58) Field of Search ................................ 428/500, 515, 428/516, 523; 264/275, 279, 255

(56) References Cited

U.S. PATENT DOCUMENTS

| | | | |
|---|---|---|---|
| 4,010,235 A | 3/1977 | Yardley et al. | ............. 264/241 |
| 4,076,891 A | 2/1978 | Yardley et al. | ............. 428/517 |

FOREIGN PATENT DOCUMENTS

| | | | |
|---|---|---|---|
| JP | A 4862875 | 9/1973 | |
| JP | A 4862876 | 9/1973 | |
| JP | B2 42412 | 1/1992 | |
| JP | A 8336938 | 12/1996 | |

*Primary Examiner*—D. S. Nakarani
(74) *Attorney, Agent, or Firm*—Birch, Stewart, Kolasch & Birch, LLP

(57) ABSTRACT

There is disclosed a molded article comprising:

(i) a part containing a hard synthetic resin; and (ii) a part containing a soft propylene based block copolymer; wherein the both parts are integrated with each other, and the soft propylene based block copolymer is prepared by a process comprising the steps of:

(I) carrying out copolymerization of propylene with ethylene until a content of a component(A) which is a propylene-ethylene copolymer component having a content of a repeating unit derived from ethylene of from about 1.5 to 6.0% by weight reaches from about 40 to 85% by weight based on the total weight of the component(A) and a below-defined component(B); and (II) carrying out copolymerization of propylene with ethylene in the presence of the component (A) prepared in step (I) until a content of the component(B), which is a propylene-ethylene copolymer component having a content of a repeating unit derived from ethylene of from about 7 to 17% by weight, reaches from about 15 to 60% by weight based on the total weight of the components (A) and (B);

provided that an intrinsic viscosity, $[\eta]B$, of the component (B) is from about 2 to 5 dl/g, and a ratio of $[\eta]B$ to an intrinsic viscosity, $[\eta]A$, of the component(A), $[\eta]B/[\eta]A$, is from about 0.5 to 1.8; and a process for producing the same.

12 Claims, 1 Drawing Sheet

MOLDED ARTICLE AND PROCESS FOR PRODUCING SAME

FIELD OF THE INVENTION

The present invention relates to a molded article whose impact resistance is superior, and which comprises a hard part whose rigidity and toughness are superior, and a soft part whose softness and feel are superior, and a process for efficiently producing the molded article.

BACKGROUND OF THE INVENTION

As to parts such as those for car interior or exterior designs and those for light electric industries, there are known parts which are formed using a hard resin that is superior in its rigidity and toughness. In order to improve their impact resistance and feel, there are also known parts of a molded article formed from one part of the hard resin mentioned above and the other part of a soft elastomer that is superior in its softness and feel, which layers are bonded with each other with the aid of an adhesive agent.

However, such a process for producing the molded article by bonding both parts with the aid of an adhesive agent leaves problems such that a bonding operation using the adhesive agent is markedly complicated and therefore disadvantageous from a viewpoint of production efficiency. Particularly when one part having a concave portion and the other part having a convex portion are inlaid with each other to produce a molded article, such an inlaying operation is remarkably troublesome.

In order to solve the problems mentioned above, for example, JP 48-62875-A and JP 48-62876-A propose a process for producing a molded article, wherein an olefin resin such as polypropylene is injection-molded on a part of a vulcanized olefin rubber such as EPDM, thereby simultaneously performing formation of a part of the olefin resin and heat-melt adhesion between the resulting part of the olefin resin and the part of the olefin rubber.

Each of the references referred to above is incorporated herein by reference in its entirety.

However, the process proposed leaves problems such that the molded articles obtainable by the process are limited in their varieties, because it is substantially impossible to vulcanize a portion of a part composed of an unvulcanized olefin rubber at a post-step, and therefore it is very difficult to carry out a process contrary to the process proposed, that is, a process comprising injection-molding an olefin rubber on a part of an olefin resin and then vulcanizing a portion of the unvulcanized olefin rubber part formed above at a post-step.

SUMMARY OF THE INVENTION

Accordingly, it is an object of the present invention to provide a molded article whose impact resistance is superior, and which comprises a hard part whose rigidity and toughness are superior, and a soft part whose softness and feel are superior.

Another object of the present invention is to provide a process for efficiently producing the molded article mentioned above.

The present inventors have undertaken extensive studies to develop a molded article and a production process thereof, which can answer the objects mentioned above. As a result, it has been found that a desired molded article can be efficiently produced by using a specific propylene based block copolymer as the soft part, and thereby the present invention has been obtained.

The present invention provides a molded article comprising:

(i) a part containing a hard synthetic resin; and (ii) a part containing a soft propylene based block copolymer;

wherein the both parts are integrated with each other, and the soft propylene based block copolymer is prepared by a process comprising the steps of:

(I) carrying out copolymerization of propylene with ethylene until a content of a component(A) which is a propylene-ethylene copolymer component having a content of a repeating unit derived from ethylene of from about 1.5 to 6.0% by weight reaches from about 40 to 85% by weight based on the total weight of the component(A) and a below-defined component(B); and (II) carrying out copolymerization of propylene with ethylene in the presence of the component (A) prepared in step (I) until a content of the component(B), which is a propylene-ethylene copolymer component having a content of a repeating unit derived from ethylene of from about 7 to 17% by weight, reaches from about 15 to 60% by weight based on the total weight of the components (A) and (B);

provided that an intrinsic viscosity, $[\eta]B$, of the component (B) is from about 2 to 5 dl/g, and a ratio of $[\eta]B$ to an intrinsic viscosity, $[\eta]A$, of the component(A), $[\eta]B/[\eta]A$, is from about 0.5 to 1.8.

The present invention also provides a process for producing a molded article, which comprises the steps of:

(1) arranging a part containing a hard synthetic resin in a mold cavity;

(2) injecting a soft propylene based block copolymer melted under heating into said mold cavity; and (3) cooling the resulting article to be solidified; whereby the molded article formed by integrating the hard synthetic resin part with the soft propylene based block copolymer part is produced; and wherein the soft propylene based block copolymer is prepared by the same process as mentioned above.

The present invention further provides a process for producing a molded article, which comprises the steps of:

(1) arranging a part containing a soft propylene based block copolymer in a mold cavity;

(2) injecting a hard synthetic resin melted under heating into said mold cavity; and (3) cooling the resulting article to be solidified; whereby the molded article formed by integrating the hard synthetic resin part with the soft propylene based block copolymer part is produced; and wherein the soft propylene based block copolymer is prepared by the same process as mentioned above.

The present invention still further provides a process for producing a molded article, which comprises the steps of:

(1) injecting a hard synthetic resin melted under heating and a soft propylene based block copolymer melted under heating independently of each other into a mold having a single cavity through respective cylinders of an injection-molding machine having two or more cylinders; and (2) cooling the resulting article to be solidified, whereby the molded article formed by integrating the hard synthetic resin part with the soft propylene based block copolymer part is produced; and wherein the soft propylene based block copolymer is prepared by the same process as mentioned above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

In Figures, the numeral 1 denotes a part containing a hard synthetic resin, and the numeral 2 denotes a part containing a soft propylene based block copolymer.

Figure 2:
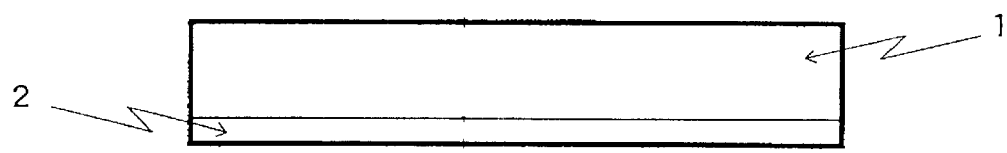
FIG. 2 shows another example of the molded article in accordance with the present invention. The molded article is composed of two parts and consists of one part 1 and one part 2, the part 1 and the part 2 being integrated with each other by heat-melt adhesion.
Figure 3:
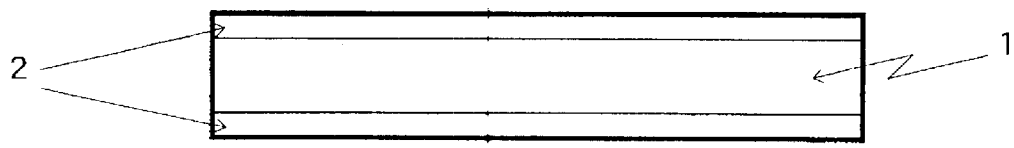
FIG. 3 shows the other example of the molded article in accordance with the present invention. The molded article is composed of three parts and consists of one part 1 and two parts 2 arranged on both sides of the part 1, the part 1 and each part 2 being integrated with each other by heat-melt adhesion.

The molded articles shown in FIG. 2 and FIG. 3 are preferred from a viewpoint of their impact resistance, feel and anti-slipping property, because said articles have soft propylene based block copolymer part(s) arranged on one or more sides of the article.

DETAILED DESCRIPTION OF THE INVENTION

The hard synthetic resin used in the present invention is a resin having a modulus of elasticity in bending higher than that of the soft propylene based block copolymer. Examples thereof are thermoplastic or thermosetting resins of usually from about 700 to about 20000 MPa in their modulus of elasticity in bending. In the present invention, thermoplastic resins are preferred because of easiness of the heat-melt adhesion with the soft propylene based block copolymer. Here, the moduli of elasticity in bending are measured according to the method prescribed in JIS-K-7203.

The thermoplastic resins are not particularly limited in kind, and polyethylene, polypropylene, thermoplastic elastomer, polyvinyl chloride, nylon, polycarbonate, polyethylene terephthalate, polymethylmethacrylate (PMMA), acrylonitrile butadiene styrene resin (ABS resin), polymer alloy, their modified products and their mixtures (compositions) are exemplified. If desired, the thermoplastic resins may also be used in combination with fillers such as talc, mica, glass fibers and rubbers, and various additives usually used such as, for example, anti-oxidants, ultraviolet ray absorbers, flame retarders and coloring agents.

From a viewpoint of recyclability of the molded article, preferred thermoplastic resins are olefin resins such as ethylene homopolymers, propylene homopolymers and copolymers of ethylene and/or propylene with α-olefins. The olefin resins may also be used in combination with fillers such as talc, mica, glass fibers and rubbers in a small proportion.

Further from a viewpoint of obtaining a preferred molded article, more preferred thermoplastic resins are propylene based resins. Examples of the propylene based resins are propylene homopolymers, propylene-α-olefin random copolymers and propylene-α-olefin block copolymers. Examples of the α-olefins are those having 2 or 4 to 10 carbon atoms such as ethylene, butene-1, pentene-1, hexene-1 and octene-1. The propylene based resins may also be used in combination with fillers such as talc, mica, glass fibers and rubbers in a small proportion.

The thermosetting resins are not particularly limited in kind, and melamine resin, phenol resin, epoxy resin, alkyd resin, urethane resin and ebonite are exemplified. If desired, the thermosetting resins may also be used in combination with fillers such as talc, mica, glass fibers and rubbers, and various additives usually used.

The soft propylene based block copolymer used in the present invention is a polymer of usually from about 100 to about 650 MPa in its modulus elasticity in bending, which is obtained by carrying out the foregoing Step(II) in the presence of the copolymer component obtained in the foregoing Step(I) to produce a copolymer component additionally. In the specification of the present invention, such a polymer is expressed by a term, "a block copolymer". However, the polymer concerned is a kind of polymer blend rather than a so-called typical block copolymer wherein an end of one polymer is bonded to an end of another polymer. Incidentally, such a term is generally used by a person skilled in the art for a high impact propylene based copolymer obtainable through the steps as mentioned above.

With respect to a proportion of the component (A) obtained in Step(I) and the component(B) obtained in Step (II), the component(A) is from about 40 to 85% by weight, preferably from about 45 to 60% by weight, and the component(B) is from about 15 to 60% by weight, preferably from about 40 to 55% by weight. When the component (A) exceeds about 85% by weight, in other words, the component (B) is less than about 15% by weight, the propylene based block copolymer obtained becomes insufficient in its low temperature impact resistance. Whereas, when the component(A) is less than about 40% by weight, in other words, the component(B) exceeds about 60% by weight, the propylene based block copolymer obtained becomes insufficient in its heat resistance.

A content of a repeating unit derived from ethylene (hereinafter, the repeating unit is abbreviated as "ethylene unit") in the component(A) obtained through Step(I) is from about 1.5 to 6.0% by weight. When the ethylene unit content in the component(A) is less than about 1.5% by weight, the propylene based block copolymer obtained is lowered in its flexibility, and when it exceeds about 6.0% by weight, it is lowered in its heat resistance. From a balanced viewpoint of the flexibility and the heat resistance, the ethylene unit content in the component(A) is preferably from about 2.5 to 4.5% by weight.

A content of the ethylene unit in the component(B) obtained through Step(II) is from about 7 to 17% by weight. When the ethylene unit content is less than about 7% by weight, the propylene based block copolymer obtained is lowered in its low temperature impact resistance, and when it exceeds about 17% by weight, it is lowered in its transparency. From a viewpoint of improving the low temperature impact resistance of the propylene based block copolymer obtained, the ethylene unit content in the component (B) is preferably from about 10 to 17% by weight.

From a viewpoint of the transparency of propylene based block copolymer obtained, an intrinsic viscosity, $[\eta]B$, of the component(B) is from about 2 to 5 dl/g, and a ratio of the intrinsic viscosity of the component(B) to an intrinsic viscosity, $[\eta]A$, of the component(A), namely, $[\eta]B/[\eta]A$ is from about 0.5 to 1.8.

When the $[\eta]B$ is less than about 2 dl/g, a content of lower molecular weight components in the propylene based block copolymer obtained increases, and when it exceeds about 5 dl/g, flowability of the propylene based block copolymer obtained lowers to result in deterioration of processability. From a balanced viewpoint of controlling the lower molecular weight components in the propylene based block copolymer obtained and the processabity thereof, $[\eta]B$ is preferably from about 2.5 to 4.0 dl/g.

When the ratio, $[\eta]B/[\eta]A$, exceeds about 1.8 or it is less than about 0.5, a compatibility of the component(A) with the component(B) lowers, so that the propylene based block copolymer obtained is deteriorated in its transparency. Particularly preferred $[\eta]B/[\eta]A$ is from about 0.8 to 1.5 from a viewpoint of the transparency.

With respect to the propylene based block copolymer, from a viewpoint of controlling a content of a component capable of being extracted with a solvent such as n-hexane, it is preferred to use a propylene based block copolymer of about 6% by weight or less in a content of a component having a molecular weight of about 26,000 or less in a 20° C. xylene-soluble portion.

A difference between the ethylene unit content (EB) of the component (B) contained in the propylene based block copolymer and the ethylene unit content (EA) of the component (A) contained therein, namely (EB)–(EA), is preferably from about 3 to 15% by weight, more preferably from about 5 to 12% by weight from a viewpoint of the transparency and the low temperature impact resistance of the copolymer.

The propylene based block copolymer can be produced with the aid of, for example, a Ziegler-Natta catalyst in a batchwise manner such that the component (A) is first produced in a polymerization vessel, and successively the component(B) is produced in that polymerization vessel, or in a continuous manner such that the component(A) and the component(B) are independently of each other produced continuously using at least two polymerization vessels, as disclosed in JP 09-324022-A, which reference is incorporated herein by reference in its entirety. A specific preferred embodiment of the production process is given as follows.

Using a Ziegler-Natta catalyst having at least titanium, magnesium and a halogen as essential components, which is composed of either (a1), (b1) and (c1), or (a2) and (b2) as mentioned below, under conditions of a temperature of from about 20 to 150° C., preferably from about 50 to 95° C., and a pressure of from atmospheric pressure to about 40 kg/cm²G, preferably from about 2 to 40 kg/cm²G, Step(I) is carried out by feeding propylene, ethylene and hydrogen (a molecular weight controller) in a vapor phase polymerization vessel in the absence of a substantially inert solvent to obtain the component(A), and successively Step(II) is carried out by feeding propylene, ethylene and hydrogen in that vapor phase polymerization vessel in the presence of the component(A) to produce the component(B), whereby the desired propylene based block copolymer can be obtained.

(a1) A trivalent titanium compound-containing solid catalyst component obtained by reducing a titanium compound represented by the formula, $Ti(OR^1)_nX_{4-n}$, wherein $R^1$ is a hydrocarbon group having 1 to 20 carbon atoms; X is a halogen atom; and n is a number satisfying $0<n\leq 4$, or by reducing a mixture of the titanium compound and an ether compound with an organomagnesium compound in the presence of an Si—O bond-carrying organosilicon compound to obtain a solid product, and then treating the obtained solid product with an ester compound and a mixture of an ether compound with titanium tetrachloride.

(b1) An organoaluminum compound.

(c1) An Si—$OR^2$ bond-carrying silicon compound, $R^2$ being a hydrocarbon group having 1 to 20 carbon atoms.

(a2) A hydrocarbyloxy group-carrying solid catalyst component obtained by reducing a titanium compound represented by the formula, $Ti(OR^1)_nX_{n-4}$, wherein $R^1$ is a hydrocarbon group having 1 to 20 carbon atoms; X is a halogen atom; and n is a number satisfying $0<n\leq 4$, with an organoaluminum compound represented by the formula, $AlR^2_mY_{3-m}$, wherein $R^2$ is a hydrocarbon group having 1 to 20 carbon atoms; Y is a halogen atom; and m is a number satisfying $1\leq m\leq 3$, to obtain a hydrocarbon solvent insoluble solid product having a hydrocarbyloxy group, subjecting the solid product to pre-polymerization with ethylene and then treating the resulting product in the presence of an ether compound and titanium tetrachloride at about 80 to 100° C. in a slurry state in a hydrocarbon solvent.

(b2) An organoaluminum compound

Here, the respective components of either (a1), (b1) and (c1), or (a2) and (b2), are used so as to make their proportions such that a molar ratio of Al atom in (b1) or (b2) to Ti atom in (a1) or (a2) is from about 1 to 2000, preferably from about 5 to 1500, and a molar ratio of Si atom in (c1) to Al atom in (b1) is from about 0.02 to 500, preferably from about 0.05 to 50.

The flowability of the propylene based block copolymer, which can be expressed, for example, in terms of a melt flow rate, can be varied by melt-kneading the propylene based block copolymer in the presence or absence of an organic peroxide in a conventional manner. For example, the flowability of the block copolymer can be regulated appropriately by melt-kneading at about 250° C. a mixture obtained by mixing the block copolymer with an organic peroxide such as 2,5-dimethyl-2,5-di-t-butyl peroxyhexane using a Henschell mixer. Further if desired, the propylene based block copolymer may be used in combination with, for example, lubricants, anti-oxidants, ultraviolet ray absorbers, antistatic agents, anti-fogging agents and nucleating agents.

Figure 1:
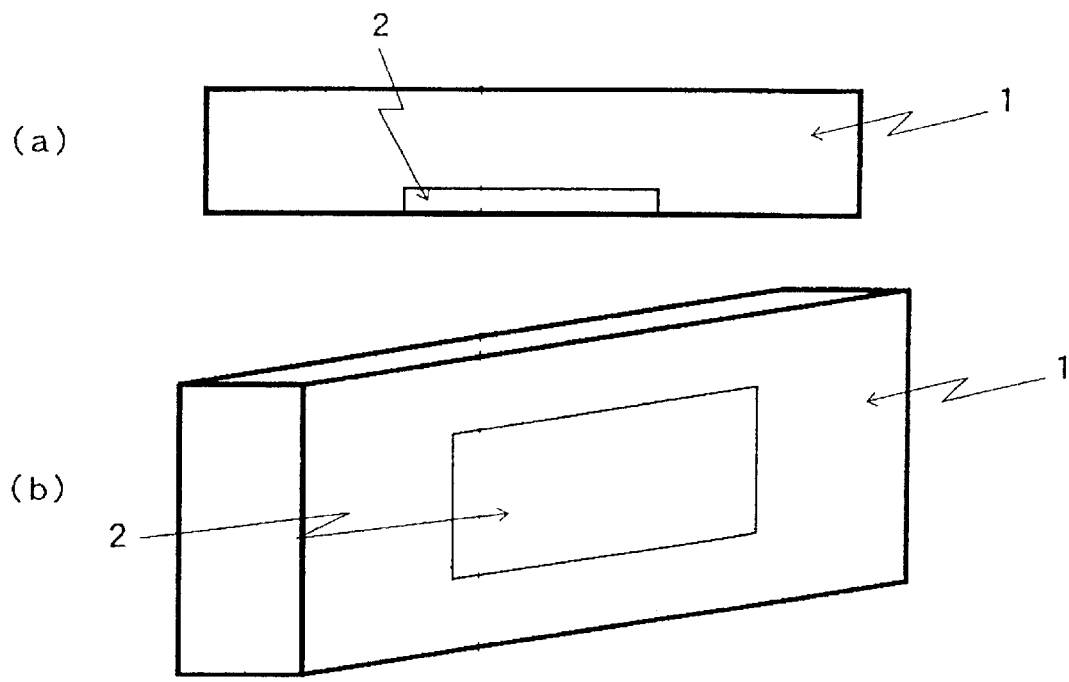
FIG. 1 shows an example of the molded article in accordance with the present invention, wherein FIG. 1(*a*) shows a cross-sectional view thereof, and FIG. 1(*b*) shows a perspective view thereof. The molded article is composed of a part 2 and the remaining part 1, the part 1 and the part 2 being integrated with each other by heat-melt adhesion.

Although a thickness of the molded article in accordance with the present invention is not particularly limited, it is usually from about 1 to 10 mm. Incidentally, the thickness means the length of from top to bottom in each of FIG. 1(a), FIG. 2 and FIG. 3 of the drawings. In general, a thickness of the hard synthetic resin part occupies from about 5 to 95% of the whole thickness of the molded article.

The molded article of the present invention can be produced by arranging the hard synthetic resin part having been formed by any known molding method in a mold cavity, thereafter injecting the soft propylene based block copolymer melted under heating into that mold cavity, and cooling the resulting article to be solidified, or to the contrary, that is, by arranging the soft propylene based block copolymer part having been formed by any known molding method in a mold cavity, thereafter injecting the hard synthetic resin melted under heating into that mold cavity, and cooling the resulting article to be solidified. Both the parts, that is, the part containing the hard synthetic resin, and the part containing the soft propylene based block copolymer, can be integrated with each other by heat-melt adhesion performed during the cooling step for the solidification after completion of the injection of the molten soft propylene based block copolymer relating to the former production process, or after completion of the injection of the molten hard synthetic resin relating to the latter production process.

In carrying out the production process of the present molded article in practice, a suitable process can be selected depending on the shape and size of the molded article and physical properties required therefor. Specifically preferred embodiments are enumerated as follows.

(1) A process comprising arranging the soft propylene based block copolymer part molded by, for example, an injection molding method, an extrusion molding method, a callendering method or a compression molding method in a mold cavity of an injection molding machine, and then injecting the hard synthetic resin melted under heating in that mold cavity, followed by cooling of the resulting article for solidification.

(2) A process comprising arranging the hard synthetic resin part molded by, for example, an injection molding method, an extrusion molding method, a callendering method or a compression molding method in a mold cavity of an injection molding machine, and then injecting the soft propylene based block copolymer melted under heating in that mold cavity, followed by cooling of the resulting article for solidification.

(3) A process comprising first injecting the soft propylene based block copolymer, followed by cooling for the solidification, and then injecting the hard synthetic resin, followed by cooling for the solidification, wherein a multi-injection molding machine and a multi-cavity mold are used.

(4) A process comprising first injecting the hard synthetic resin, followed by cooling for the solidification, and then injecting the soft propylene based block copolymer, followed by cooling for the solidification, wherein a multi-injection molding machine and a multi-cavity mold are used.

In addition, the molded article of the present invention can be produced using an injection-molding machine having two or more cylinders by injecting the hard synthetic resin and the soft propylene based block copolymer independently of each other into a mold having a single cavity through respective cylinders of said injection molding machine, followed by cooling for the solidification.

The three-parted molded article as shown in FIG. 3 can be produced by a sandwich molding method, wherein the soft propylene based block copolymer is first injected, thereafter the hard synthetic resin is injected, and then the resulting article is cooled to be solidified.

According to the present invention, a molded article superior in its impact resistance, which comprises a soft part superior in its softness and feel and a hard part superior in its rigidity and toughness can be produced efficiently.

The molded article in accordance with the present invention can be used for various purposes, and is of extensively wide application including, for example, interior or exterior car parts such as instrument panel, pillar garnish, roof rail garnish, door glove outer, column cover, door trim, lump end rubber, bumper fascia and bumper beam, housings for household appliances and light electric industries, all sorts of grips, foot rubber, speaker edge for audio, car-ride, handy or general purpose CD player damper, shock absorbing materials, dustproof mask, all sorts of switches and all sorts of key tops.

EXAMPLES

The present invention is illustrated in more detail with reference to the following Examples, which are only illustrative, and are not limitative for the scope of the present invention.

In the Examples, the following molding conditions and test procedures were used.

1. Compression Molding Conditions

Molding machine: NF-37 manufactured by Sinto Metal Co., Ltd.

Size of molded product: 300 mm×260 mm×1 mm(thickness)

Heating temperature: 200° C.

Pre-heating period of time: 5 minutes

Pressure applied: 100 kg/cm$^2$

Pressure-applying period of time: 5 minutes

2. Injection Molding Conditions

Molding machine: FS160S25ASEN manufactured by Nissei Plastic Industrial Co., Ltd.

Size of molded product: 100 mm×400 mm×5 mm(thickness)

Cylinder temperature: 220° C.

Mold temperature: 40° C.

3. Melt Flow Rate (MFR)

MFR was measured by the method prescribed in JIS-K-7210, Condition 14.

4. Proportion(PA) of Component(A) and Proportion(PB) of Component(B) in the Propylene Based Block Copolymer (% by Weight)

PA and PB were calculated on the basis of material balance in the production processes of the component(A) and the component(B), respectively.

5. Intrinsic Viscosity, [η], of Propylene Based Block Copolymer

The [η] was measured in tetralin at 135° C. using Ubbelohde's viscometer.

6. Intrinsic Viscosity, [η]A, of Component(A) and Intrinsic Viscosity, [η]B, of Component(B)

The [η]A was measured by the method mentioned in the above item 5 after completion of the production process of the component (A), i.e. Step(I), and the [η]B was calculated by the following equation, $$[\eta]B = ([\eta]AB - [\eta]A \times PA/100) \times 100/PB$$

wherein the [η]A, PA and PB are as mentioned above and the [η]AB is the same as the [η] mentioned above item 5.

7. Ethylene Unit Content in Component(A), EA, and that in Component(B), EB

The EA was measured after completion of Step(I) by a $^{13}$C-NMR method disclosed in page 616 of "KOBUNSHI HANDOBUKKU (High Molecular Hand Book)" issued by KINOKUNIYA SYOTEN(Book store) in 1995, and the EB was calculated by the following equation, $$EB = (EAB - EA \times PA/100) \times 100/PB$$

wherein the EA, PA and PB are as mentioned above, and the EAB is a value measured after completion of Step(II) by the $^{13}$C-NMR method mentioned above.

8. Modulus of Elasticity in Bending
   Measured by the method prescribed in JIS-K-7203.
9. Impact Resistance
   The molded article was cut down to a size of 100 mm(longitudinal)×100 mm(lateral) to prepare a test piece having the same thickness as the molded article. The test piece was allowed to stand at a thermostatically controlled temperature of 23° C. for 5 hours and thereafter fixed to a holder having an opening portion of 50 mm diameter set up in the thermostatically controlled environment. Using the high rate impact tester RIT-8000 manufactured by Rheometrics, INC., the test piece was punched with a dart of ⅝ inch tip diameter at a definite speed of 1 m/s. Then, a relationship between the load measured with a load cell set up to a dart and a dart displacement, and the broken surface of the test piece were found to determine the state of a fracture.

Example 1

A pellet form propylene based block copolymer, EXCELLEN KS37G1 (a trade mark of Sumitomo Chemical Co., Ltd., MFR=2.5 g/10 min., modulus of elasticity in bending at 23° C.=330 MPa) was compression-molded to obtain a sheet of 300 mm×260 mm×1 mm(thickness).

With respect to the above propylene based block copolymer, a polymerization ratio of the propylene-ethylene copolymer component obtained in Step (I) (the component (A)) to the propylene-ethylene copolymer component obtained in Step (II) (the component(B)) was 51.6/48.4(by weight), and the ethylene unit content in the component(A), EA, and the ethylene unit content in the component(B), EB, were 3.6% by weight and 15.2% by weight, respectively. Therefore the ethylene unit content difference (EB−EA) was 11.6% by weight.

The above pellet form propylene based block copolymer had been obtained by subjecting a powder form propylene based block copolymer to peroxide decomposition under an atmosphere of nitrogen gas. With respect to said powder form propylene based block copolymer, an intrinsic viscosity of the component (A), $[\eta]A$, and that of the component (B), $[\eta]B$, were 3.03 and 3.96 dl/g, respectively, and therefore the intrinsic viscosity ratio, $[\eta]B/[\eta]A$, was 1.31.

The foregoing sheet obtained by the compression molding was cut down to prepare a cutting piece of 100 mm×260 mm×1 mm(thickness). The cutting piece was brought into close contact with the wall of the mold cavity of the injection molding machine, the mold was closed and then a propylene homopolymer, Sumitomo Noblene H501 produced by Sumitomo Chemical Co., Ltd. (MFR=3 g/10 min., modulus of elasticity in bending at 23° C.=1370 MPa) was injected into the mold. The resulting article was cooled to be solidified, thereby obtaining a molded article of 100 mm×400 mm×5 mm(thickness)

The molded article thus obtained was punched from the side of the propylene homopolymer part to evaluate its impact resistance. The molded article showed a ductile fracture. The results are as shown in Table 1.

Comparative Example 1

Procedure was carried out in a manner similar to that of Example 1, except that no cutting piece of the sheet obtained by the compression molding was brought into contact with the wall of the mold cavity, thereby obtaining a article of the propylene homopolymer only.

The article obtained was evaluated for its impact resistance in the same manner as in Example 1. It was found that the article showed a brittle fracture, and the fracture started from a portion having the largest strain, that is, the backside of the portion against which the dart bumped. It is considered that the reason for the brittle fracture is because there is no part of the soft propylene based block copolymer at that portion of the article. The results are as shown in Table 1.

TABLE 1

|  | Example 1 | Comparative Example 1 |
| --- | --- | --- |
| Thickness of molded article (mm) | 5 | 5 |
| Hard synthetic resin | H501 | H501 |
| Thickness of hard synthetic resin part (mm) | 4 | 5 |
| Soft copolymer | KS37G1 | — |
| Thickness of soft copolymer part (mm) | 1 | — |
| Impact strength of the molded article | Ductile fracture | Brittle fracture |

What is claimed is:

1. A molded article comprising:
   (i) a part containing a hard synthetic resin; and
   (ii) a part containing a soft propylene based block copolymer;
   wherein the both parts are integrated with each other, and the soft propylene based block copolymer is prepared by a process comprising the steps of:
   (I) carrying out copolymerization of propylene with ethylene until a content of a component (A) reaches from about 40 to 85% by weight based on the total weight of the component (A) and a component (B) defined below, said component (A) being a propylene-ethylene copolymer component having a content of a repeating unit derived from ethylene of from about 1.5 to 6.0% by weight; and
   (II) carrying out copolymerization of propylene with ethylene in the presence of the component (A) prepared in step (I) until a content of component (B) reaches from about 15 to 60% by weight based on the total weight of the components (A) and (B), said component (B) being a propylene-ethylene copolymer component having a content of a repeating unit derived from ethylene of from about 7 to 17% by weight;
   provided that an intrinsic viscosity, $[\eta]B$, of the component (B) is from about 2 to 5 dl/g, and a ratio of $[\eta]B$ to an intrinsic viscosity, $[\eta]A$, of the component (A), namely $[\eta]B/[\eta]A$, is from about 0.5 to 1.8.

2. The molded article according to claim 1, wherein the hard synthetic resin contains a thermoplastic or thermosetting resin of from about 700 to 20000 MPa in a modulus of elasticity in bending.

3. The molded article according to claim 1, wherein the hard synthetic resin contains a thermoplastic resin.

4. The molded article according to claim 1, wherein the hard synthetic resin contains a thermoplastic olefin resin.

5. The molded article according to claim 1, wherein the hard synthetic resin is a thermoplastic propylene based resin.

6. The molded article according to claim 1, wherein a difference between the content(EB) of the repeating unit derived from ethylene in the component(B) and the content (EA) of the repeating unit derived from ethylene in the component (A), (EB)−(EA), is from about 3 to 15% by weight.

7. The molded article according to claim 1, wherein the part containing the soft propylene based block copolymer is arranged at one side of the part containing the hard synthetic resin.

8. The molded article according to claim 1, wherein the part containing the soft propylene based block copolymer is arranged at both sides of the part containing the hard synthetic resin.

9. A molded article comprising:
(i) a part containing a hard synthetic resin having a modulus of elasticity in bending of from about 700 to 20,000 MPA; and
(ii) a part containing a soft propylene based block copolymer having a modulus of elasticity in bending of from about 100 to about 650 MPA;
wherein the both parts are integrated with each other, and the soft propylene based block copolymer is prepared by a process comprising the steps of:
(I) carrying out copolymerization of propylene with ethylene until a content of a component (A) reaches from about 40 to 85% by weight based on the total weight of the component (A) and a component (B) defined below, said component (A) being a propylene-ethylene copolymer component having a content of a repeating unit derived from ethylene of from about 1.5 to 6.0% by weight; and
(II) carrying out copolymerization of propylene with ethylene in the presence of the component (A) prepared in step (I) until a content of component (B) reaches from about 15 to 60% by weight based on the total weight of the components (A) and (B), said component (B) being a propylene-ethylene copolymer component having a content of a repeating unit derived from ethylene of from about 7 to 17% by weight;
provided that an intrinsic viscosity, $[\eta]B$, of the component (B) is from about 2 to 5 dl/g, and a ratio of $[\eta]B$ to an intrinsic viscosity, $[\eta]A$, of the component (A), namely $[\eta]B/[\eta]A$, is from about 0.5 to 1.8.

10. A process for producing a molded article, which comprises the steps of:
(1) arranging a part containing a hard synthetic resin in a mold cavity;
(2) injecting a soft propylene based block copolymer melted under heating into said mold cavity; and
(3) cooling the resulting article to be solidified; whereby the molded article formed by integrating the hard synthetic resin part with the soft propylene based block copolymer part is produced; and
wherein the soft propylene based block copolymer is prepared by a process comprising the steps of:
(I) carrying out copolymerization of propylene with ethylene until a content of a component(A) which is a propylene-ethylene copolymer component having a content of a repeating unit derived from ethylene of from about 1.5 to 6.0% by weight reaches from about 40 to 85% by weight based on the total weight of the component(A) and a below-defined component(B); and
(II) carrying out copolymerization of propylene with ethylene in the presence of the component (A) prepared instep (I) until a content of the component(B), which is a propylene-ethylene copolymer component having a content of a repeating unit derived from ethylene of from about 7 to 17% by weight, reaches from about 15 to 60% by weight based on the total weight of the components (A) and (B);
provided that an intrinsic viscosity, $[\eta]B$, of the component (B) is from about 2 to 5 dl/g, and a ratio of $[\eta]B$ to an intrinsic viscosity, $[\eta]A$, of the component(A), $[\eta]B/[\eta]A$, is from about 0.5 to 1.8.

11. A process for producing a molded article, which comprises the steps of:
(1) arranging a part containing a soft propylene based block copolymer in a mold cavity;
(2) injecting a hard synthetic resin melted under heating into said mold cavity; and
(3) cooling the resulting article to be solidified; whereby the molded article formed by integrating the hard synthetic resin part with the soft propylene based block copolymer part is produced; and
wherein the soft propylene based block copolymer is prepared by a process comprising the steps of:
(I) carrying out copolymerization of propylene with ethylene until a content of a component(A) which is a propylene-ethylene copolymer component having a content of a repeating unit derived from ethylene of from about 1.5 to 6.0% by weight reaches from about 40 to 85% by weight based on the total weight of the component(A) and a below-defined component(B); and
(II) carrying out copolymerization of propylene with ethylene in the presence of the component (A) prepared in step (I) until a content of the component(B), which is a propylene-ethylene copolymer component having a content of a repeating unit derived from ethylene of from about 7 to 17% by weight, reaches from about 15 to 60% by weight based on the total weight of the components (A) and (B);
provided that an intrinsic viscosity, $[\eta]B$, of the component (B) is from about 2 to 5 dl/g, and a ratio of $[\eta]B$ to an intrinsic viscosity, $[\eta]A$, of the component(A), $[\eta]B/[\eta]A$, is from about 0.5 to 1.8.

12. A process for producing a molded article, which comprises the steps of:
(1) injecting a hard synthetic resin melted under heating and a soft propylene based block copolymer melted under heating independently of each other into a mold having a single cavity through respective cylinders of an injection-molding machine having two or more cylinders; and
(2) cooling the resulting article to besolidified, whereby the molded article formed by integrating the hard synthetic resin part with the soft propylene based block copolymer part is produced; and
wherein the soft propylene based block copolymer is prepared by a process comprising the steps of:
(I) carrying out copolymerization of propylene with ethylene until a content of a component(A) which is a propylene-ethylene copolymer component having a content of a repeating unit derived from ethylene of from about 1.5 to 6.0% by weight reaches from about 40 to 85% by weight based on the total weight of the component(A) and a below-defined
(II) component(B); and
(II) carrying out copolymerization of propylene with ethylene in the presence of the component (A) prepared instep (I) until a content of the component(B), which is a propylene-ethylene copolymer component having a content of a repeating unit derived from ethylene of from about 7 to 17% by weight, reaches from about 15 to 60% by weight based on the total weight of the components (A) and (B);
provided that an intrinsic viscosity, $[\eta]B$, of the component (B) is from about 2 to 5 dl/g, and a ratio of $[\eta]B$ to an intrinsic viscosity, $[\eta]A$, of the component(A), $[\eta]B/[\eta]A$, is from about 0.5 to 1.8.

* * * * *